United States Patent [19]
Li

[11] Patent Number: 6,074,014
[45] Date of Patent: Jun. 13, 2000

[54] FRONT HUB OF CHILDREN TRICYCLE

[76] Inventor: Hsing Li, 17, Yung Hsing Street, North District, Taichung, Taiwan

[21] Appl. No.: 09/073,445

[22] Filed: May 6, 1998

[51] Int. Cl.[7] .................................................. B60B 27/06
[52] U.S. Cl. .......................... 301/2.5; 301/110.5; 301/111
[58] Field of Search .................................. 301/2.5, 105.1, 301/110.5, 111; 280/259; 74/594.1

[56] References Cited

U.S. PATENT DOCUMENTS

| | | | |
|---|---|---|---|
| 1,619,024 | 3/1927 | Honold | 301/2.5 |
| 2,125,763 | 8/1938 | Anderson | 74/594.1 |
| 4,966,419 | 10/1990 | Cunard | 301/2.5 |
| 5,236,248 | 8/1993 | Chen | 301/2.5 |

*Primary Examiner*—Russell D. Stormer
*Attorney, Agent, or Firm*—Rabin & Champagne, P.C.

[57] ABSTRACT

A tricycle front hub is composed of a rectangular through hole and a fastening device located securely in the rectangular through hole for holding a crank rod of a front wheel of the tricycle. The rectangular through hole is provided with a plurality of retaining apparatuses. The fastening device is composed of a first fastening portion and a second fastening portion, which are provided respectively with a plurality of retaining apparatuses. The fastening device is located securely is the rectangular through hole such that the retaining apparatuses of the fastening device are securely engaged with the retaining apparatuses of the rectangular through hole.

1 Claim, 3 Drawing Sheets

FRONT HUB OF CHILDREN TRICYCLE

FIELD OF THE INVENTION

The present invention relates generally to a tricycle, and more particularly to a front hub of the tricycle.

BACKGROUND OF THE INVENTION

As shown in FIG. 1, a front wheel 2 of the prior art children tricycle is provided in the center thereof with a through hole 21 in which a crank rod 3 is fastened by welding. The front wheel 2 of the prior art described above is defective in design in that the crank rod 3 is not fastened securely with the through hole 21 by welding, and that the welding method of fastening the crank rod 3 with the through hole 21 of the prior art front hub is time-consuming and ineffective at best

SUMMARY OF THE INVENTION

The primary objective of the present invention is therefore to provide a children tricycle with a front hub free from the drawbacks of the prior art front hub described above.

In keeping with the principle of the present invention, the foregoing objective of the present invention is attained by a front hub comprised of a rectangular through hole, which is provided in the inner wall of one end thereof with two recesses opposite in location to each other, and in the inner wall of another end thereof with two arresting protuberances opposite in location to each other. The two recesses of the rectangular through hole of the front hub are engaged securely with two protuberances of a crank rod fastening device, whereas the two arresting protuberances of the rectangular through hole of the front hub are engaged securely with the two depressions of the crank rod fastening device. The crank rod of the tricycle is securely held by the crank rod fastening device.

The foregoing objective, features, functions, and advantages of the present invention will be more readily understood upon a thoughtful deliberation of the following detailed description of a preferred embodiment of the present invention with reference to the accompanying drawings.

BRIEF DESCRIPTION OF THE DRAWINGS

FIG. 2B shows a partial enlarge view of the rectangular through hole of the present invention.

DETAILED DESCRIPTION OF THE EMBODIMENT

Figure 1:
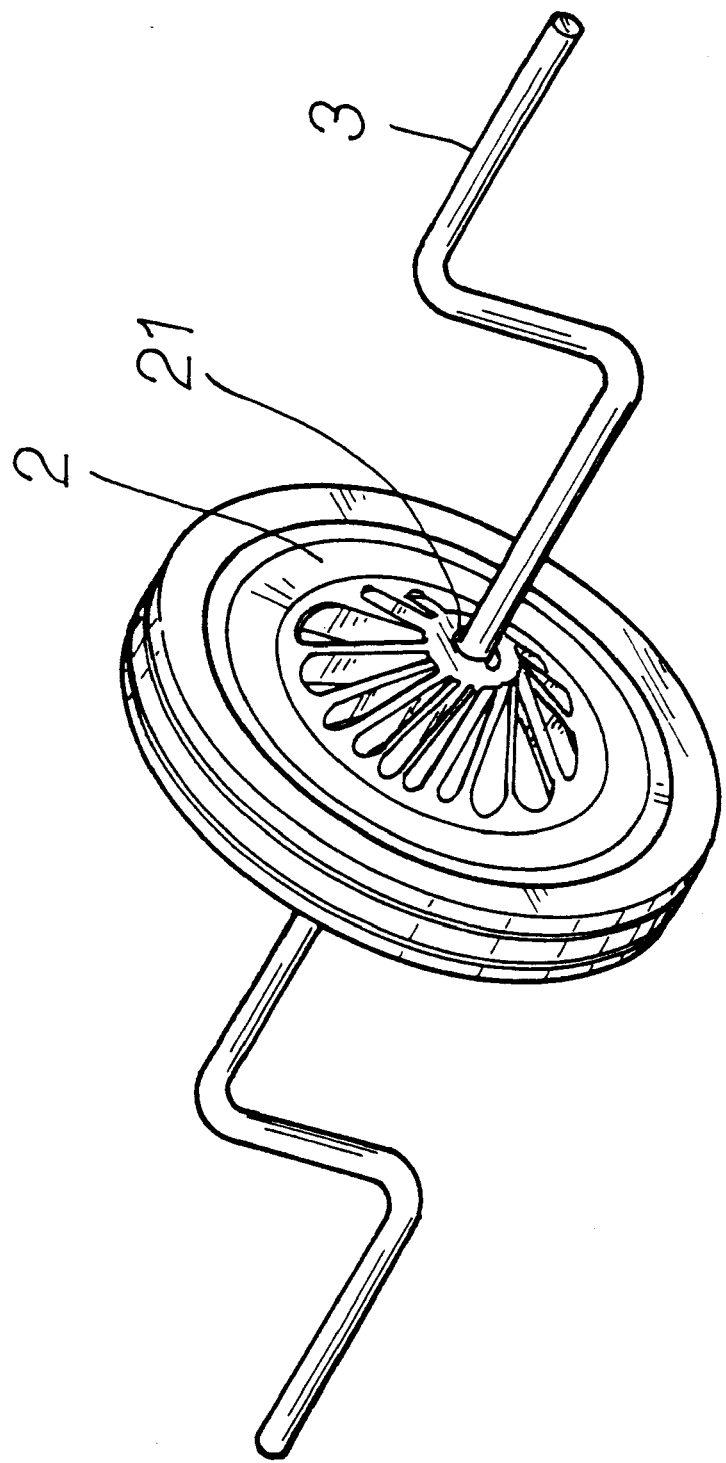
FIG. 1 shows a perspective view of a tricycle front wheel of the prior art
Figure 2:
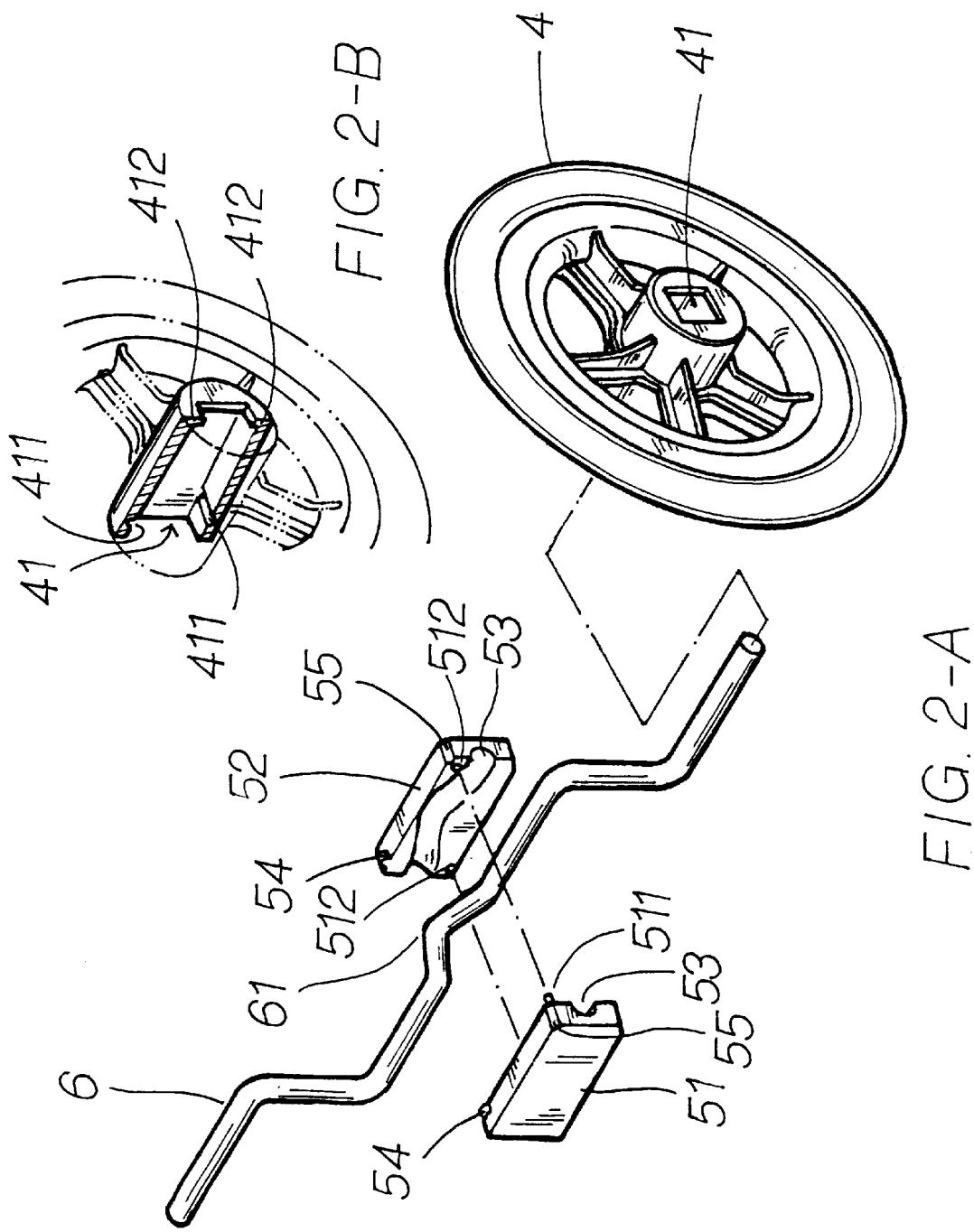
FIG. 2-A shows an exploded view of a tricycle front hub of the present invention.
Figure 3:
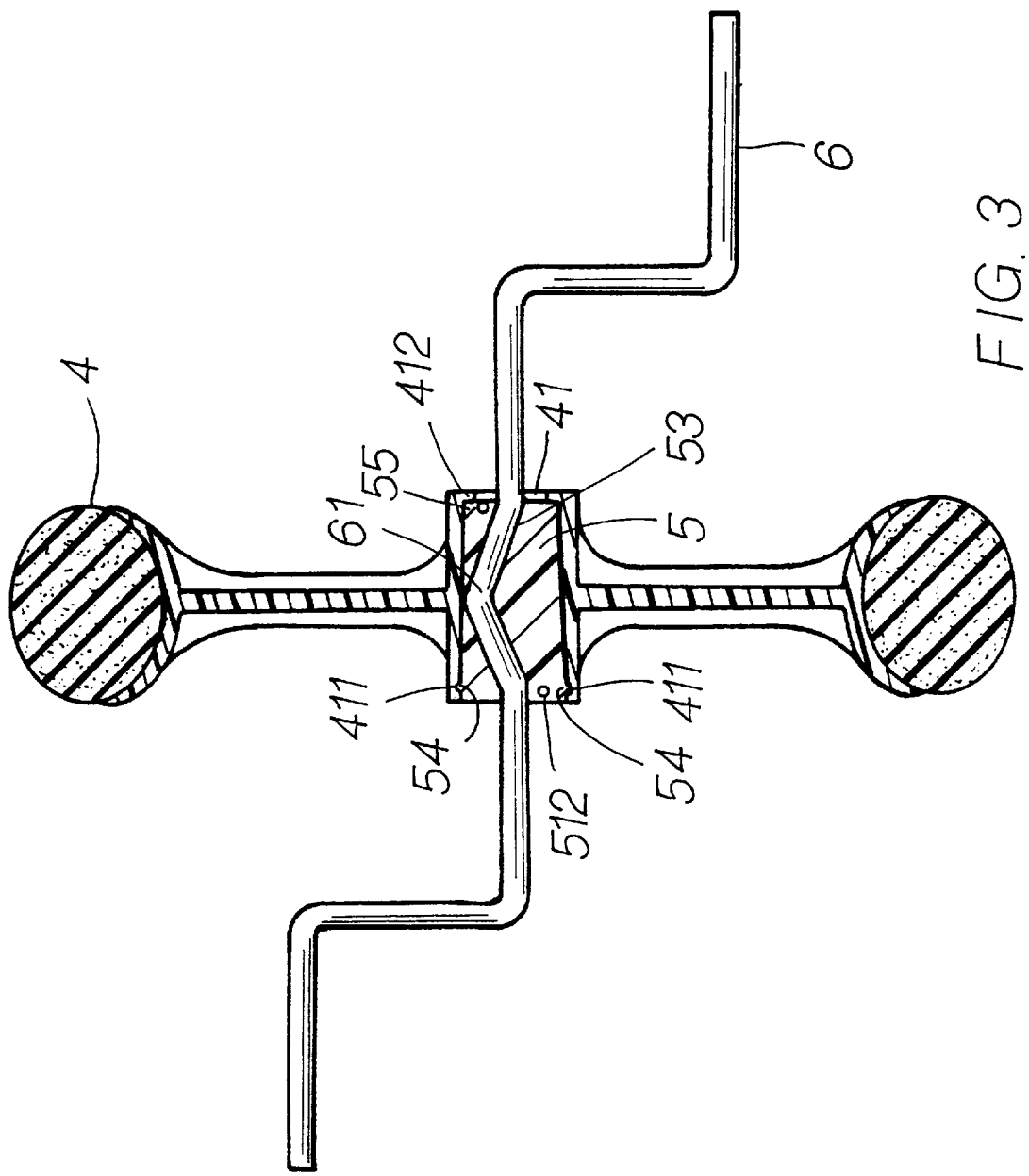
FIG. 3 shows a sectional view of the tricycle front hub of the present invention in combination.

As shown in FIGS. 2-A, 2-B and 3, a front wheel 4 of a children tricycle is provided in the hub thereof with a rectangular through hole 41, which is provided in the inner wall of one end thereof with two recesses 411 opposite in location to each other, and in the inner wall of another end thereof with two arresting protuberances 412. A fastening device 5 is secured to the through hole 41 for fastening a crank rod 6 of the children tricycle. The fastening device 5 is composed of a first fastening portion 51 and a second fastening portion 52 corresponding in shape and size to the first fastening portion 51. The first fastening portion 51 and the second fastening portion 52 are provided respectively and correspondingly with a curved slot 53. The first fastening portion 51 and the second fastening 52 are provided respectively with a protuberance 54 corresponding in size and location to the recess 411 of the rectangular through hole 41, and a depression 55 corresponding in size and location to the arresting protuberance 412 of the rectangular through hole 41. The fastening device 5 is securely located in the rectangular through hole 41 of the front wheel 4 such that the protuberances 54 of the first fastening portion 51 and the second fastening portion 52 are engaged with the recesses 411 of the rectangular through hole 41, and that the depressions 55 of the first fastening portion 51 and the second fastening portion 52 are engaged with the arresting protuberances 412 of the rectangular through hole 41. Further, the first fastening portion 51 has pins 511 which engage with holes 512 formed in the second fastening portion 52, to align these two portions together.

The crank rod 6 of the children tricycle is provided with a curved portion 61 corresponding in shape and size to the curved slots 53 of the first fastening portion 51 and the second fastening portion 52. The crank rod 6 is put through the through hole 41 of the front wheel 4 of the children tricycle such that the curved portion 61 of the crank rod 6 is securely located in the curved slots 53 of the first fastening portion 51 and the second fastening portion 52 of the fastening device 5.

It is therefore readily apparent that the present invention is relatively simple in construction and free from the drawbacks of the welding method of the prior art for fastening the crank rod with the front hub of the children tricycle.

What is claimed is:

1. A tricycle front hub assembly comprising:

a crank rod;

a hub having a rectangular through hole; and a fastening device located in said rectangular through hole for fastening the crank rod of the tricycle;

wherein said rectangular through hole is provided in an inner wall of respective ends thereof with two recesses opposite in location to each other, and two arresting protuberances;

wherein said fastening device is composed of a first fastening portion and a second fastening portion, said first fastening portion and said second fastening portion each being provided with a protuberance corresponding in location to and engageable with said recesses of said rectangular through hole, and each having a depression respectively engageable with said arresting protuberances of said rectangular through hole;

wherein said crank rod is put through said rectangular through hole such that said crank rod is held securely by said first fastening portion and said second fastening portion, and that said protuberances of said first fastening portion and said second fastening portion are engaged with said recesses of said rectangular through hole, and said depressions of said first fastening portion and said second fastening portion are engaged with said arresting protuberances of said rectangular through hole;

wherein said first fastening portion is provided with a curved slot, and said second fastening portion is provided with a curved slot corresponding in location, size and shape to said curved slot of said first fastening portion;

wherein said crank rod is provided with a curved portion; and wherein said crank rod is held securely by said first fastening portion and said second fastening portion such that said curved portion of said crank rod is located in said curved slots of said first fastening portion and said second fastening portion.

* * * * *